(12) United States Patent
Glugla et al.

(10) Patent No.: US 9,777,697 B2
(45) Date of Patent: Oct. 3, 2017

(54) SPARK PLUG FOULING DETECTION FOR IGNITION SYSTEM

(71) Applicant: Ford Global Technologies, LLC, Dearborn, MI (US)

(72) Inventors: Chris Paul Glugla, Macomb, MI (US); Garlan J. Huberts, Milford, MI (US); Nelson William Morrow, Saline, MI (US); Qiuping Qu, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 539 days.

(21) Appl. No.: 14/535,174

(22) Filed: Nov. 6, 2014

(65) Prior Publication Data

US 2015/0176558 A1 Jun. 25, 2015

Related U.S. Application Data

(60) Provisional application No. 61/918,593, filed on Dec. 19, 2013.

(51) Int. Cl.
*F02P 17/12* (2006.01)
*F02P 17/10* (2006.01)
(Continued)

(52) U.S. Cl.
CPC ............ *F02P 17/12* (2013.01); *F02P 3/0456* (2013.01); *F02P 17/10* (2013.01); *F01N 11/00* (2013.01);
(Continued)

(58) Field of Classification Search
CPC .... F02P 17/12; F02P 3/0456; F02P 2017/121; F02P 17/10; F02P 3/01; F02P 3/05;
(Continued)

(56) References Cited

U.S. PATENT DOCUMENTS 3,942,102 A * 3/1976 Kuhn .................. F02P 11/06
324/399
4,437,436 A * 3/1984 Graiff ................. F02B 47/04
123/1 A
(Continued)

FOREIGN PATENT DOCUMENTS

WO 2013115712 A1 8/2013

OTHER PUBLICATIONS

Huberts, Garlan J. et al., "Spark Plug Fouling Detection for Ignition System," U.S. Appl. No. 14/077,064, filed Nov. 11, 2013, 31 pages.
(Continued)

*Primary Examiner* — Sizo Vilakazi
*Assistant Examiner* — Brian Kirby
(74) *Attorney, Agent, or Firm* — Julia Voutyras; McCoy Russell LLP

(57) ABSTRACT

Methods and systems are provided for determining a type of spark plug fouling. In one example, a method may include differentiating spark plug fouling due to soot accumulation from spark plug fouling due to fuel additive accumulation based on a current on a control wire of the spark plug following application of a dwell command. Further, exhaust oxygen sensor degradation and/or exhaust catalyst degradation may be determined based on switching frequencies of one or more exhaust oxygen sensors and the type of spark plug fouling.

20 Claims, 7 Drawing Sheets

(51) Int. Cl.
*F02P 3/045* (2006.01)
*F01N 11/00* (2006.01)
*F02D 41/14* (2006.01)
*F02B 75/12* (2006.01)
*F02D 41/22* (2006.01)

(52) U.S. Cl.
CPC .... *F02B 2075/125* (2013.01); *F02D 41/1441* (2013.01); *F02D 41/1454* (2013.01); *F02D 41/1495* (2013.01); *F02D 2041/227* (2013.01); *F02D 2041/228* (2013.01); *F02P 2017/121* (2013.01); *Y02T 10/123* (2013.01)

(58) Field of Classification Search
CPC .... F02P 9/002; Y02T 10/123; F02D 41/1495; F02D 41/1441; F02D 2041/227; F02D 2041/228; F02D 41/1454; F01N 11/00; F02B 2075/125; H01F 38/12
USPC .......... 123/143, 146.5, 179.5, 339.11, 123/406.11–406.14, 600–611, 620, 634, 123/594, 644; 324/378, 382, 386, 388, 324/391, 393, 399
See application file for complete search history.

(56) References Cited

U.S. PATENT DOCUMENTS

| | | | | |
|---|---|---|---|---|
| 4,674,447 A * | 6/1987 | Davis | ............... | C10L 1/305 |
| | | | | 123/1 A |
| 4,773,380 A * | 9/1988 | Narita | ............... | F02P 3/0442 |
| | | | | 123/609 |
| 5,283,527 A * | 2/1994 | DeBiasi | ............... | F02P 17/12 |
| | | | | 123/643 |
| 5,751,147 A * | 5/1998 | Nakata | ............... | F02P 17/12 |
| | | | | 324/391 |
| 5,777,216 A | 7/1998 | Van Duyne et al. | | |
| 5,913,302 A * | 6/1999 | Ruman | ............... | F02B 77/04 |
| | | | | 123/609 |
| 5,941,208 A * | 8/1999 | Biemelt | ............... | F02D 41/3029 |
| | | | | 123/169 CL |
| 6,100,701 A * | 8/2000 | Hoy | ............... | F02P 3/0554 |
| | | | | 324/388 |
| 6,512,375 B1 * | 1/2003 | Yamada | ............... | F02P 17/12 |
| | | | | 324/384 |
| 6,998,846 B2 | 2/2006 | Daniels et al. | | |
| 7,124,019 B2 * | 10/2006 | Goodell | ............... | F02P 17/12 |
| | | | | 324/388 |
| 7,673,614 B2 | 3/2010 | Inada et al. | | |
| 8,106,754 B2 * | 1/2012 | Hashizume | ............. | F02P 9/002 |
| | | | | 123/406.13 |
| 8,132,556 B2 * | 3/2012 | Glugla | ............... | F02D 35/021 |
| | | | | 123/406.11 |
| 8,397,695 B2 | 3/2013 | Glugla et al. | | |
| 8,683,976 B2 | 4/2014 | Cunningham et al. | | |
| 9,249,774 B2 * | 2/2016 | Huberts | ............... | F02P 17/12 |
| 9,670,894 B2 * | 6/2017 | Huberts | ............... | F02P 17/12 |
| 2009/0229569 A1 * | 9/2009 | Glugla | ............... | F02P 3/04 |
| | | | | 123/406.2 |
| 2009/0241520 A1 * | 10/2009 | Gendron | ............... | F01N 3/025 |
| | | | | 60/295 |
| 2010/0024288 A1 * | 2/2010 | Jimeson | ............... | C10L 1/02 |
| | | | | 44/452 |
| 2012/0150415 A1 | 6/2012 | Glugla et al. | | |
| 2013/0139786 A1 | 6/2013 | Glugla et al. | | |
| 2013/0206106 A1 * | 8/2013 | Huberts | ............... | F02B 77/08 |
| | | | | 123/406.27 |

OTHER PUBLICATIONS

Glugla, Chris P. et al., "Method and System for Pre-Ignition Control," U.S. Appl. No. 14/510,996, filed Oct. 9, 2014, 48 pages.
Glugla, Chris P. et al., "Spark Plug Fouling Detection for Ignition System," U.S. Appl. No. 14/535,157, filed Nov. 6, 2014, 41 pages.

* cited by examiner

SPARK PLUG FOULING DETECTION FOR IGNITION SYSTEM

CROSS REFERENCE TO RELATED APPLICATIONS

The present application claims priority to U.S. Provisional Patent Application No. 61/918,593, entitled "SPARK PLUG FOULING DETECTION FOR IGNITION SYSTEM", filed on Dec. 19, 2013, the entire contents of which are hereby incorporated by reference for all purposes.

FIELD

The present disclosure relates to methods and systems for detecting and differentiating spark plug fouling due to soot from fouling due to fuel additives in an internal combustion engine.

BACKGROUND/SUMMARY

Engine ignition systems may include a spark plug for delivering an electric current to a combustion chamber of a spark-ignited engine to ignite an air-fuel mixture and initiate combustion. Based on engine operating conditions, spark plug fouling can occur wherein a firing tip of the spark plug insulator becomes coated with a foreign substance, such as fuel, oil, or soot. Once fouled, the spark plug may be unable to provide adequate voltage to trigger cylinder combustion for all engine cycles until the spark plug is sufficiently cleaned or changed. As an example, the spark plug may be cleaned by burning off the accumulated soot from the spark plug tip.

Spark plug fouling and pre-ignition caused by hot fouled spark plugs is also a significant issue in areas with poor fuel quality control. Fuel additives such as methycyclopentadienyl manganese tricarbonyl (MMT), lead or ferrocene may build up electrically conductive and thermally insulating deposits on the spark plug ceramic. Such build up may cause misfires or pre-ignition (PI). Due to the potential severity of misfires or PI at high speed and load in boosted engines, vehicle manufacturers may recommend very short spark plug change intervals.

The inventors herein have recognized that the cause of spark plug fouling may determine the control action to be taken. For example, spark plug fouling due to soot accumulation may not necessitate spark plug changes as frequently as may be required for spark plug fouling due to fuel additives. Likewise, spark plug fouling due to soot may be less prone to pre-ignition while spark plug fouling due to fuel additives may require additional pre-ignition mitigating (or pre-empting) control actions. Further still, the presence of fuel additives can accelerate exhaust catalyst and exhaust air-fuel ratio sensor degradation.

Thus in one example, the different causes of spark plug fouling may be better detected and differentiated by a method for an engine comprising: for each engine cylinder, differentiating spark plug fouling due to soot accumulation from spark plug fouling due to fuel additive accumulation based on a fraction of combustion cycles, over one or more given drive cycles, having an ignition current switching time that is higher than a threshold duration. In this way, spark plug fouling from fuel additives may be better addressed.

As an example, an engine ignition system may include a spark plug coupled to each engine cylinder, an ignition coil for initiating ignition at the spark plug, and a control wire for adjusting a control current of the ignition coil. An engine controller may output a dwell command to the control wire for initiating dwell of the ignition coil. In response to the dwell command, a current of the control wire may rise. The controller may then monitor a duration elapsed since the dwell command until the control wire current falls below a predetermined value, herein also referred to as the switching time. The expected switching time may be based on the dwell command. If the actual switching time is more than the expected time for a threshold number of combustion cycles during a given drive cycle (e.g., a fraction of combustion or engine cycles), spark plug fouling due to fuel additives may be suspected. Accordingly, a diagnostic code indicating spark plug change may be set and various mitigating actions to pre-empt spark plug fouling induced pre-ignition may be performed.

Alternatively, if the fraction of engine cycles for which the switching time is above a threshold duration is not greater than a threshold percentage, the spark plugs may be fouled due to soot accumulation. Accordingly, a diagnostic code for cleaning the spark plug may be set and, to burn off the soot from the spark plug, an engine speed-load may be raised, and/or spark timing may be advanced, so as to raise a tip temperature of the spark plug above a threshold temperature for a duration. If following the raising of tip temperature, the switching time remains above the expected switching time, spark plug fouling due to fuel additive accumulation may be determined.

In this way, by identifying spark plug fouling due to fuel additives, and differentiating it from spark plug fouling due to soot accumulation, spark plug fouling induced pre-ignition may be reduced and timely mitigated. In addition, exhaust catalyst and air-fuel ratio sensor degradation may be timely identified and addressed. By providing spark plug change recommendations based on evidence of malfunction or degradation, rather than a predetermined period of time or amount of vehicle usage, spark plug change recommendations may not be provided too soon, lowering overall vehicle operational costs for the driver. By diagnosing spark plug health, engine life is extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
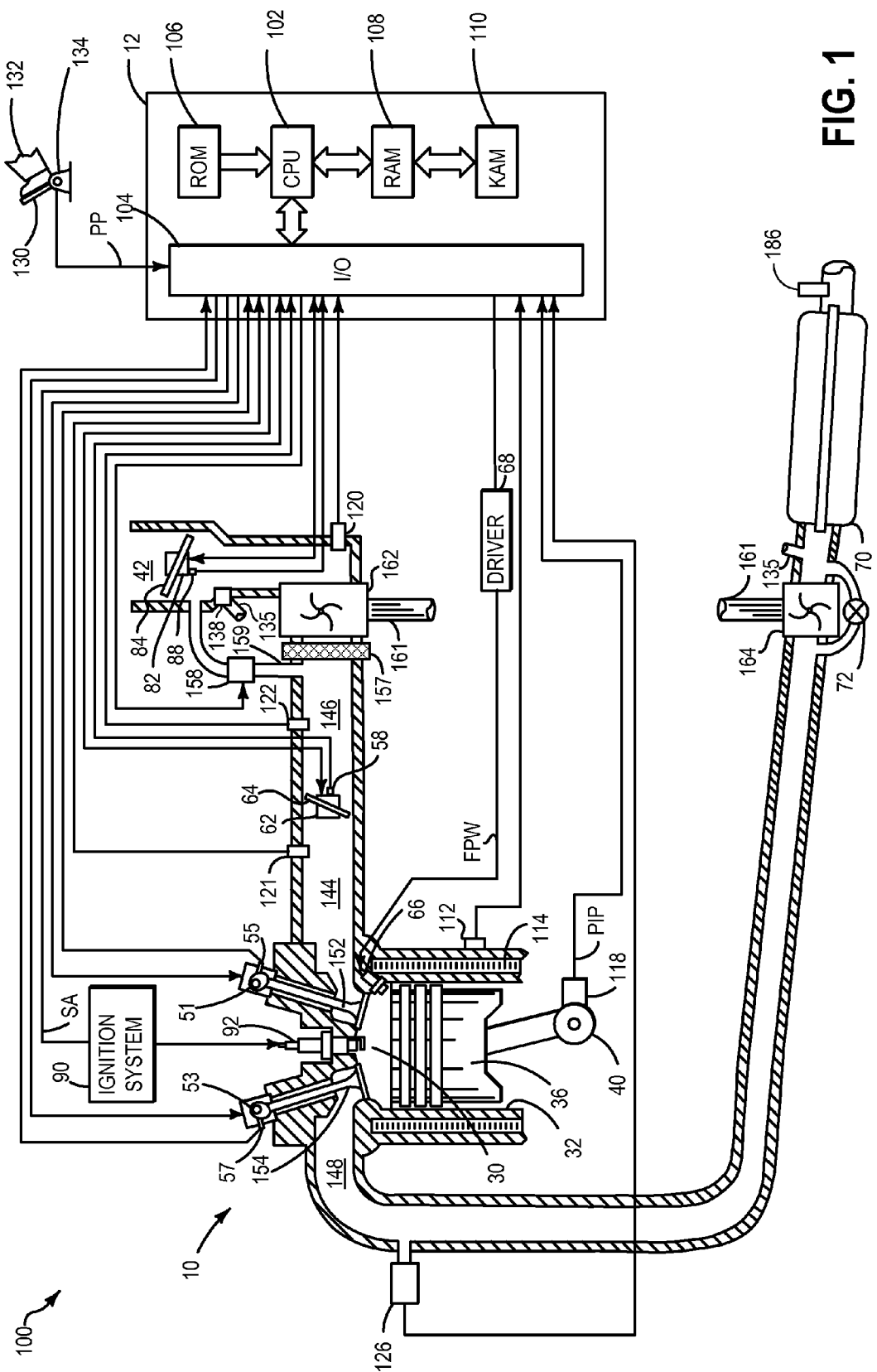
FIG. 1 is a schematic diagram of an engine.
Figure 2:
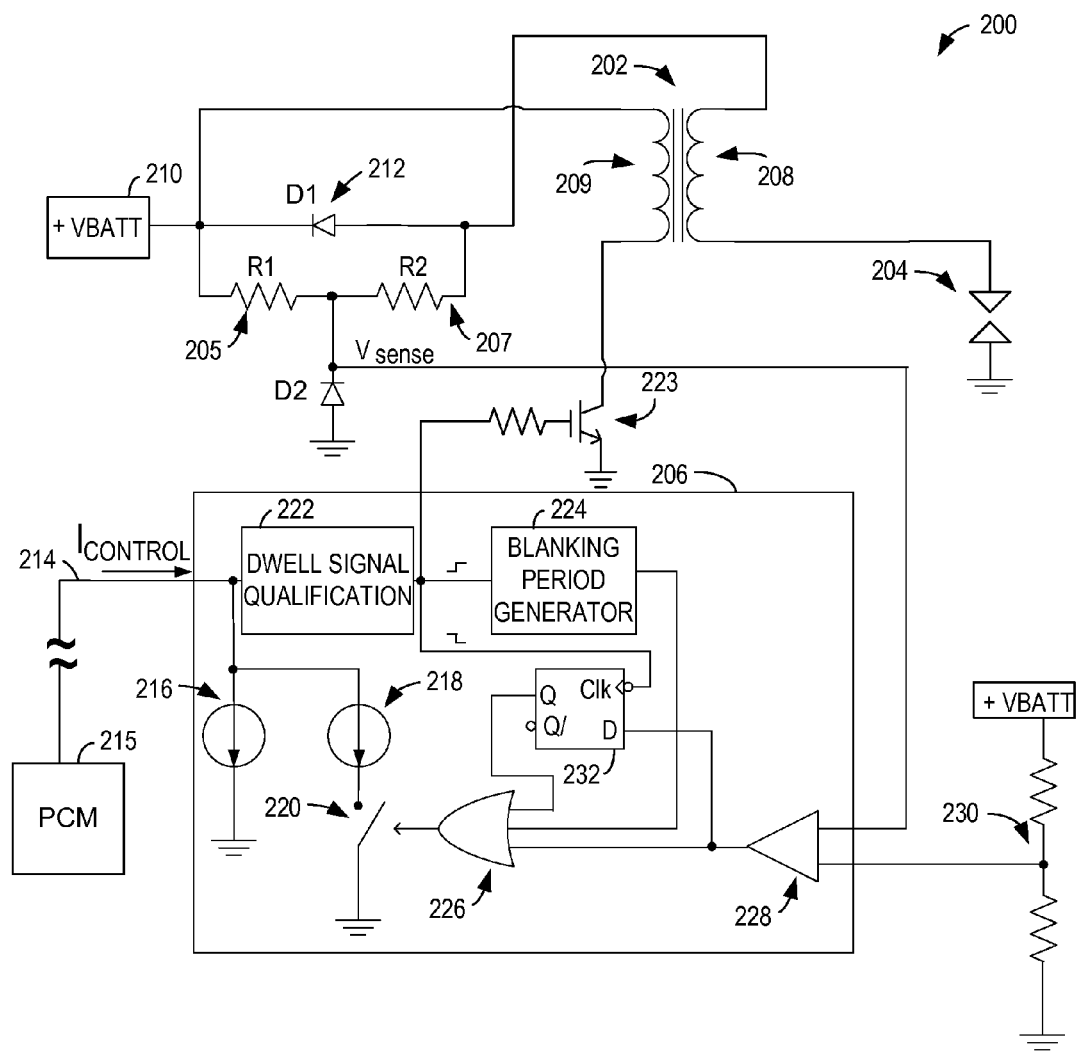
FIG. 2 shows a diagram of an ignition system in accordance with an embodiment of the present disclosure.
Figure 3:
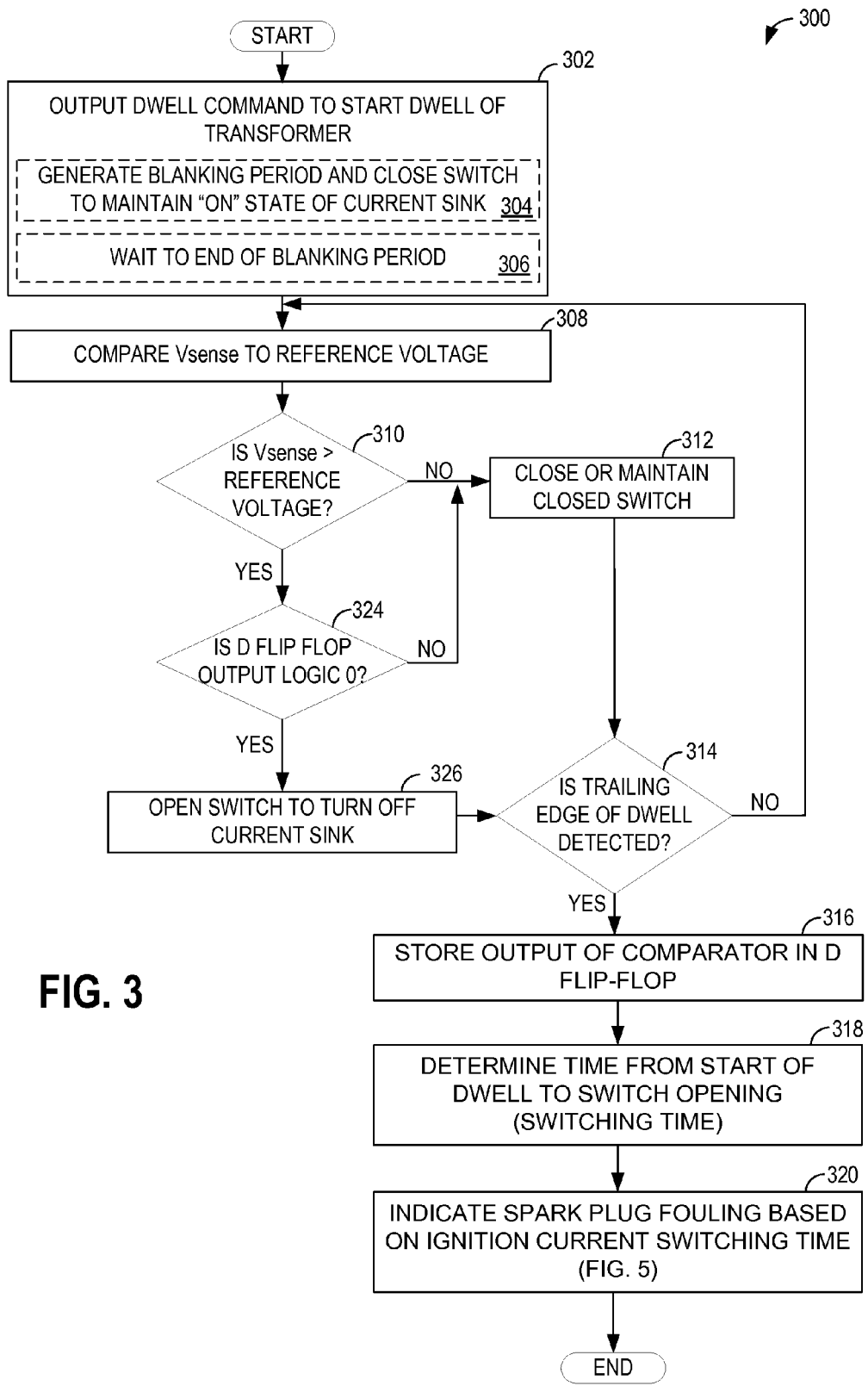
FIG. 3 is a flow diagram of a method for determining spark plug fouling and pre-ignition in accordance with an embodiment of the present disclosure.
Figure 4:
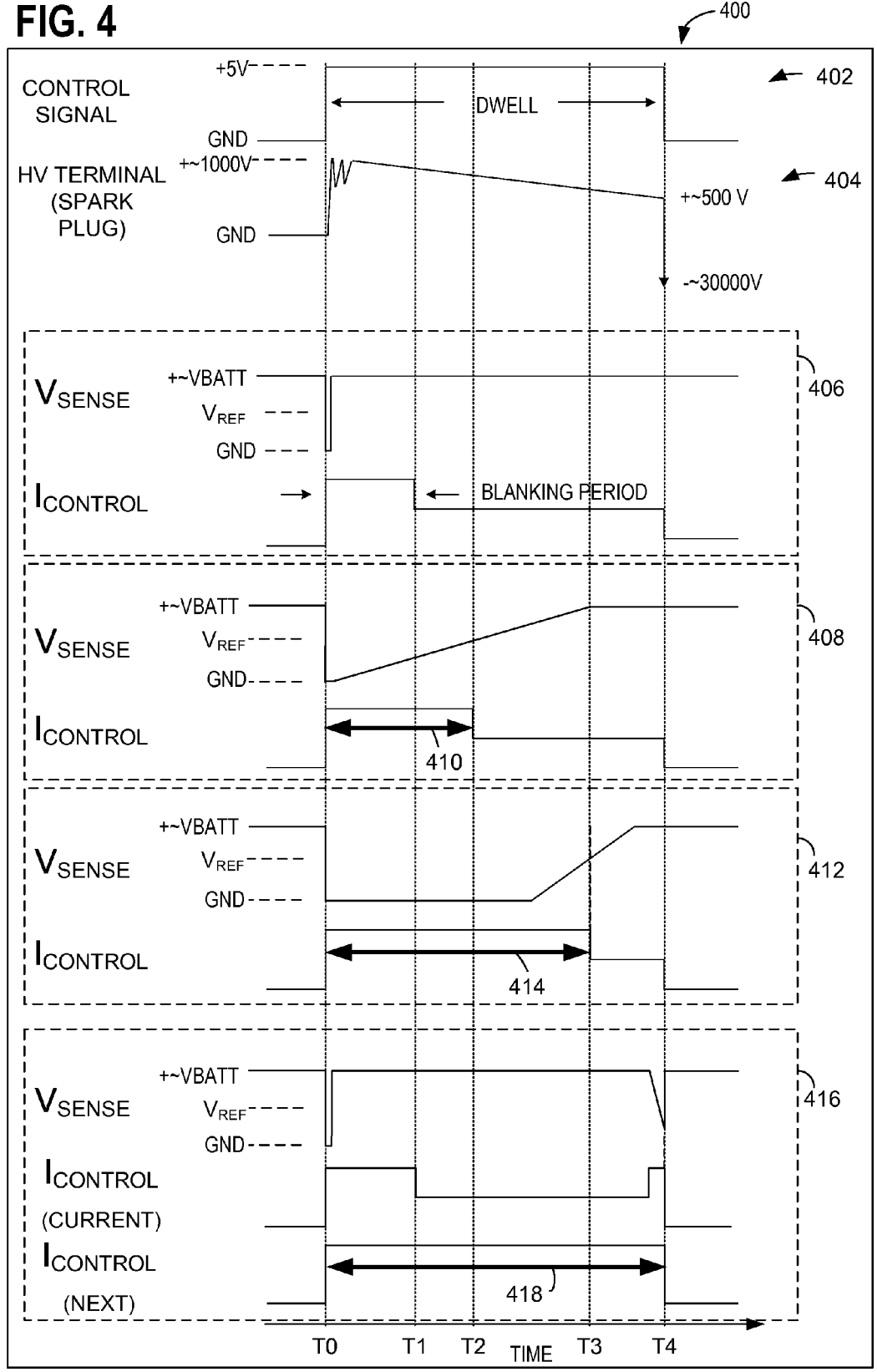
FIG. 4 shows waveforms of the operation of the ignition system responsive to a dwell command under various conditions in accordance with embodiments of the present disclosure.
Figure 5:
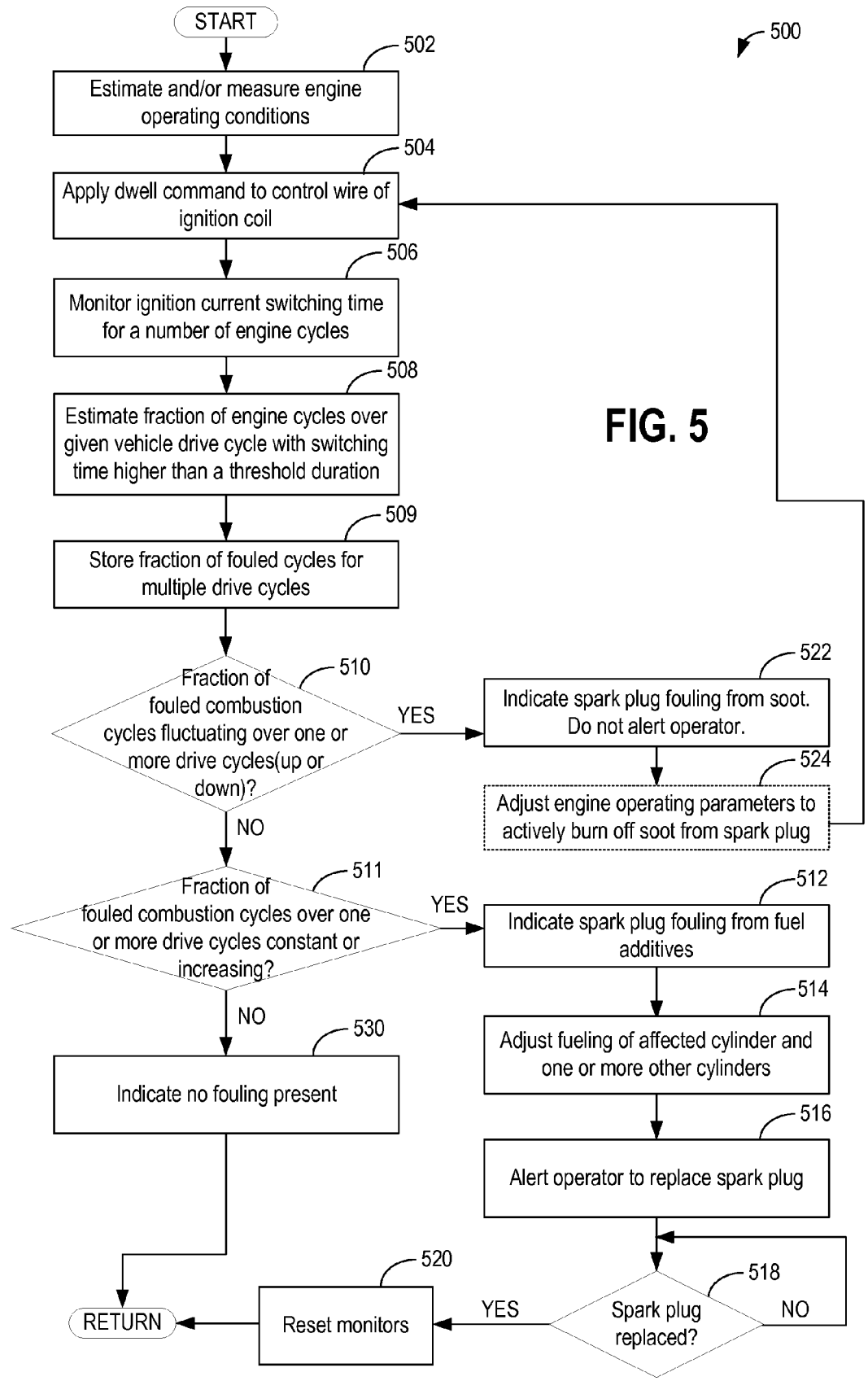
FIG. 5 shows a flow diagram of a method for differentiating spark plug fouling due to soot accumulation from spark plug fouling due to fuel additive accumulation.
Figure 6:
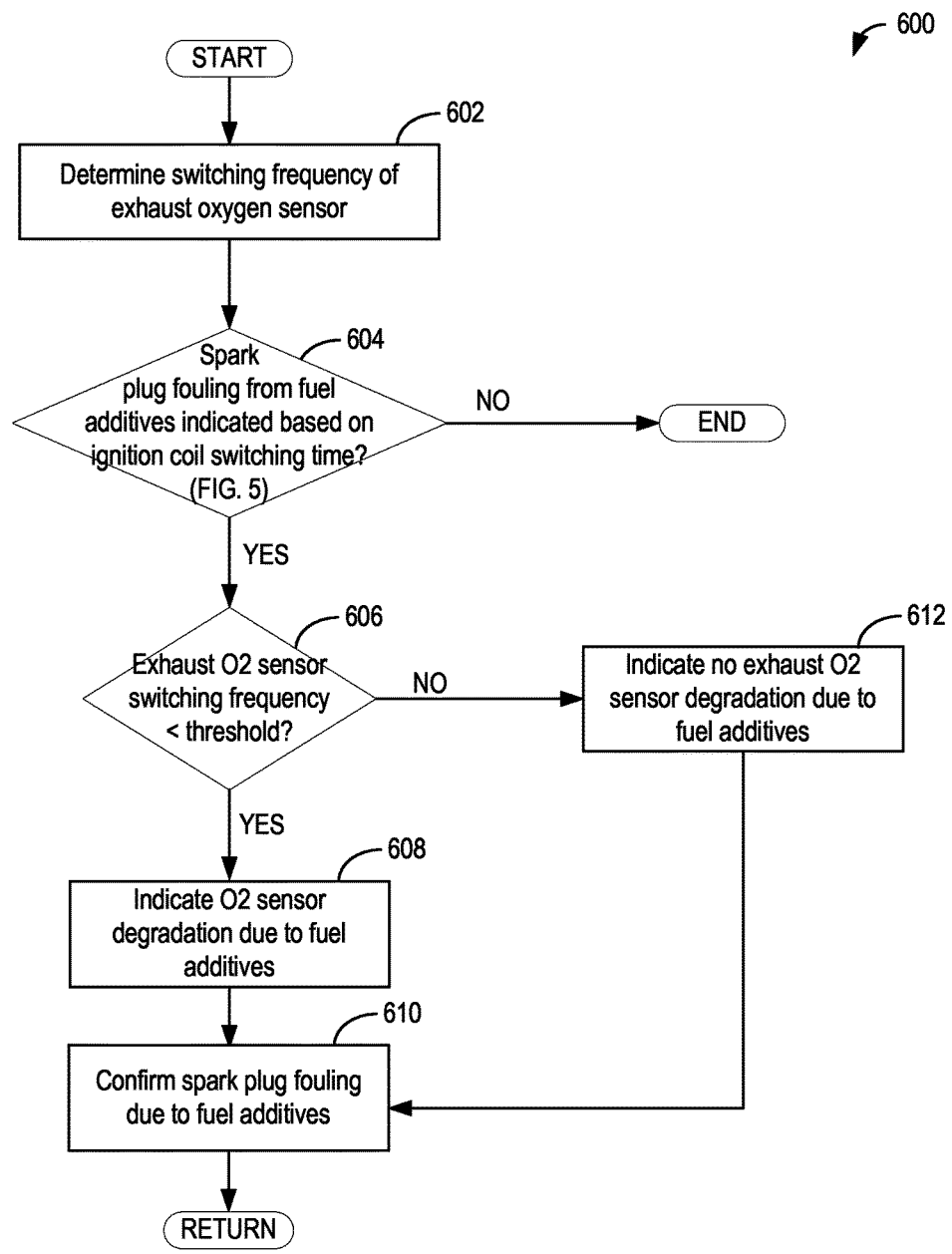
FIG. 6 shows a flow diagram of a method for determining exhaust oxygen sensor degradation based on a switching frequency of the exhaust oxygen sensor relative to a threshold.
Figure 7:
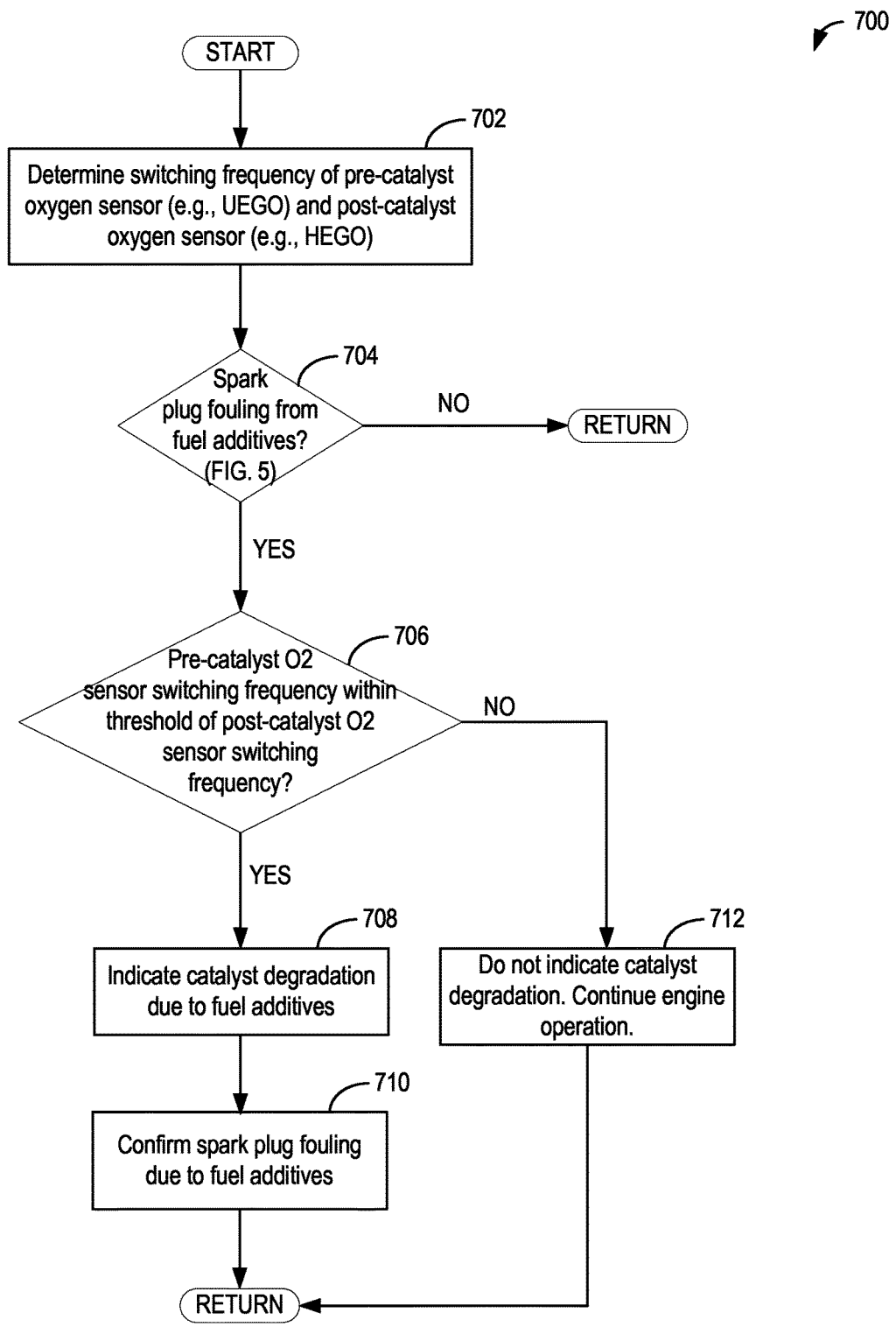
FIG. 7 shows a flow diagram of a method for determining exhaust catalyst degradation based on a switching frequency ratio between a first exhaust oxygen sensor upstream of the exhaust catalyst and a second exhaust oxygen sensor downstream of the exhaust catalyst.

The following description relates to systems and methods for determining a type of fouling of one or more spark plugs in an engine system, such as the engine system of FIG. 1. An ignition coil coupled to the spark plug may include a control wire, as shown at FIG. 2. Upon applying a dwell command on the control wire to start dwell of the ignition coil, a switching time from the beginning of the dwell command to a switching point where a current of the control wire falls below a predetermined value may be determined. FIG. 3 shows a method for determining spark plug fouling based on the switching time relative to a threshold. Example control currents for different levels of spark plug fouling are shown at FIG. 4. In some examples, spark plug fouling due to either of soot and fuel additive accumulation may cause an increase in the switching time above an expected switching time (e.g., for a fraction of combustion cycles over a vehicle drive cycle). As such, upon determining a type of spark plug fouling based on the fraction of engine cycles over a given drive cycle with a switching time higher than a threshold duration, mitigating actions may be taken in order to determine whether the fouling is due to soot or fuel additive accumulation, as shown at FIG. 5. If the spark plug fouling is due to fuel additives, exhaust oxygen sensor degradation and/or exhaust catalyst degradation due to fuel additives may also result. FIGS. 6-7 present methods for determining exhaust oxygen sensor degradation and exhaust catalyst degradation based on switching frequencies of one or more exhaust oxygen sensors relative to set thresholds, the thresholds set based on the presence of spark plug fouling due to fuel additives.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12. Engine 10 includes combustion chamber 30 and cylinder walls 32 with piston 36 positioned therein and connected to crankshaft 40. Combustion chamber 30 is shown communicating with intake manifold 144 and exhaust manifold 148 via respective intake valve 152 and exhaust valve 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In addition, intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the boost chamber 146.

In some embodiments, engine 10 is configured to provide exhaust gas recirculation, or EGR. When included, EGR is provided via EGR passage 135 and EGR valve 138 to the engine air intake system at a position downstream of air intake system (AIS) throttle 82 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Compressor 162 draws air from air intake passage 42 to supply boost chamber 146. In some examples, air intake passage 42 may include an air box (not shown) with a filter. Exhaust gases spin turbine 164 which is coupled to compressor 162 via shaft 161. A vacuum operated wastegate actuator 72 allows exhaust gases to bypass turbine 164 so that boost pressure can be controlled under varying operating conditions. In alternate embodiments, the wastegate actuator may be pressure or electrically actuated. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in passage 146, downstream of compressor 162, for cooling the boosted aircharge delivered to the engine intake. In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Distributorless ignition system 90 provides an ignition spark to combustion chamber 30 via spark plug 92 in response to controller 12. The ignition system 90 may include an induction coil ignition system, in which an ignition coil transformer is connected to each spark plug of the engine. An example ignition system that may be utilized in the engine of FIG. 1 is described in more detail below with respect to FIG. 2.

A first exhaust oxygen sensor 126 is shown coupled to exhaust manifold 148 upstream of catalytic converter 70. A second exhaust oxygen sensor 186 is shown coupled in the exhaust downstream of the converter 70. The first exhaust oxygen sensor 126 and the second exhaust oxygen sensor 186 may be any one of a Universal Exhaust Gas Oxygen (UEGO) sensor, a heated exhaust oxygen sensor (HEGO), or two-state exhaust oxygen sensor (EGO). The UEGO may be a linear sensor wherein the output is a linear pumping current proportional to an air-fuel ratio Converter 70 includes an exhaust catalyst. For example, the converter 70 can include multiple catalyst bricks. In another example, multiple emission control devices, each with multiple bricks, can be used. Converter 70 can be a three-way type catalyst in one example. While the depicted example shows first exhaust oxygen sensor 126 upstream of turbine 164, it will be appreciated that in alternate embodiments, the first exhaust oxygen sensor 126 may be positioned in the exhaust manifold downstream of turbine 164 and upstream of convertor 70. Further, the first exhaust oxygen sensor 126 may be referred to herein as the pre-catalyst oxygen sensor and the second exhaust oxygen sensor 186 may be referred to herein as the post-catalyst oxygen sensor. The first and second oxygen sensors may give an indication of exhaust air-fuel ratio. For example, the second exhaust oxygen sensor 186 may be used for catalyst monitoring while the first exhaust oxygen sensor 126 may be used for engine control. Further, both the first exhaust oxygen sensor 126 and the second exhaust oxygen sensor 186 may operate at a switching frequency or response time in which the sensor switches between lean and rich air-fuel control (e.g., switches from lean to rich or from rich to lean). In one example, an exhaust oxygen sensor degradation rate may be based on the switching frequency of the sensor, the degradation rate increasing for decreasing switching frequency. In another example, the exhaust oxygen sensor degradation rate may be based on a response time of the exhaust oxygen sensor, the degradation rate increasing for decreasing response time. For example, if the sensor is a linear sensor (such as a UEGO), the sensor degradation rate may be based on the response time of the sensor. Alternatively, if the sensor is not a linear sensor (such as a HEGO), the sensor degradation rate may be based on the switching frequency of the sensor. For the purposes of describing the methods below, switching frequency and response time may be used interchangeably in inferring spark plug fouling. However, in some embodiments, the analysis of switching frequency vs. response time may be based on whether the exhaust oxygen sensor is nonlinear or linear, respectively.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator pedal position (PP) adjusted by a foot 132 of a vehicle operator; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is described merely as an example, and that intake and exhaust valve opening and/or closing timings may vary, such as to provide positive or negative valve overlap, late intake valve closing, or various other examples.

FIG. 2 shows an example ignition system 200 that may be included in the engine 100 of FIG. 1. The ignition system 200 includes an ignition circuit for charging an induction ignition coil 202 of a transformer to fire a spark plug 204, and the spark plug fouling and pre-ignition detecting components, resistors 205 (R1) and 207 (R2), diode D2, and dwell qualification/detection module 206 for evaluating voltage and/or current output from the ignition system in order to determine a level of spark plug fouling. The ignition circuit includes a spark plug 204 connected to a high voltage terminal of a secondary winding 208 of the ignition coil 202. The low voltage terminal of the secondary winding 208 is connected to a voltage source 210 (e.g., a voltage of a vehicle battery) via a feed-forward diode 212 (D1) connected in parallel to two resistors 205 (R1) and 207 (R2). At the beginning of ignition coil dwell, the secondary winding 208 of the ignition coil may generate approximately 1000 V peak, termed feed-forward voltage or Vff. Vff slowly decays over the duration of dwell. The magnitude of the peak of Vff and the rate of decay depend on the characteristics of the coil and the magnitude of the battery voltage applied to the primary winding 209 of the coil during dwell. The total Vff is distributed between the spark plug 204 and the low voltage end of the secondary winding 208 as determined by the impedance to ground at the spark plug (e.g., the fouling impedance based on the level of spark plug fouling) and the impedance to the voltage source 210 across the feed-forward diode 212. The feed-forward diode 212 is commonly used in ignition coils to prevent bulk current flow (e.g., arcing) at the spark plug 204 at the start of dwell. The impedance across the diode is determined by the two resistors, 205 (R1) and 207 (R2), placed in series with one another and in parallel across the diode 212. By selecting values for the resistors, the signal output may be "tuned" to be effective at a selected level of plug fouling for safeguarding the engine from misfires caused by plug fouling and to reliably detect the occurrence of pre-ignition. For example, lower values of resistors will make detection less sensitive (e.g., enable relatively higher levels of fouling to be sensed) while higher values will make detection more sensitive (e.g., enable relatively lower levels of fouling to be sensed).

The dwell qualification and plug fouling/pre-ignition module 206 is connected to the ignition circuit by an input tap connected between the resistors 205 (R1) and 207 (R2) in order to determine the level of plug fouling based upon a rate of decay of the voltage at the location of the input tap, as described in more detail below. A control signal may be provided over a control wire 214 and utilized to start dwell of the ignition coil 202 of the ignition circuit. For example, the control signal may be provided by a Powertrain Control Module (PCM) 215. At the beginning of dwell, both current sinks 216 and 218 on the control signal are ON (e.g., switch 220 is closed). The dwell signal qualification module 222 receives the control signal and detects the beginning edge of the dwell. At the beginning edge of the dwell, the control signal is forwarded to a solid-state switching device, such as an insulated-gate bipolar transistor (IGBT) 223, which establishes and disrupts the current flow to the primary windings 209 of the ignition coil 202. The dwell signal qualification module and solid-state device may form an intelligent driver for dwell control of the ignition coils, including interpretive logic to decode or otherwise interpret the dwell commands provided for control of the ignition coils.

The dwell signal qualification module 222 may also instruct a blanking period generator 224 to generate a blanking period (e.g. with a duration of 500 µsec) which holds switch 220 closed to avoid any ringing present on the feed-forward voltage at the beginning of dwell. Accordingly, the blanking period generator may output a logic 1 for a specified time interval during the beginning of dwell. The output of the blanking period generator 224 is provided as an input to a logical OR gate 226 that controls switch 220. In particular, the logical OR gate 226 may control the switch 220 to remain closed when the output of the OR gate 226 is logic 1 (e.g., when any of the inputs to the OR gate 226 is logic 1).

The input tap described above is connected at the node between the two sensing resistors 205 (R1) and 207 (R2), and at the cathode of clamping diode D2 which will keep the input voltage not less than a diode forward voltage below ground, and that provides a sense voltage (Vsense) to a comparator 228 for comparing the sense voltage to a reference voltage at 230 (e.g., a voltage set ratio-metrically between a battery voltage and ground). The sense voltage is the inverse of the voltage appearing at the high voltage terminal of the secondary windings 208 and its magnitude is related to the ratio between the resistors 205 (R1) and 207 (R2) and the shunting impedance (e.g., the fouling level) of the spark plug 204. The comparator 228 may be configured to output logic 1 while the sense voltage is less than the reference voltage at 230 and logic 0 while the sense voltage is greater than the reference voltage.

As the logic OR gate 226 is configured to maintain the switch 220 in the closed state when the output of the gate 226 is logical 1, the switch 220 remains closed during the blanking period. After the blanking period, switch 220 is controlled by the output of a voltage comparator 228 and the state of a D flip-flop 232. The D flip-flop 232 stores and/or outputs the output of the comparator 228 at the end of each dwell (e.g., at the falling edge of a clock signal received from the dwell signal qualification module 222) and outputs the stored value at other times (e.g., at a steady state or rising edge of the clock signal). If the D flip-flop 232 stores a logic 0, switch 220 is controlled by voltage comparator 228. As the feed-forward voltage decays throughout dwell, at some point under moderate levels of fouling at the spark plug, the sense voltage will rise above the threshold level (e.g., above the reference voltage). At this point, current sink 218 is turned off (e.g., switch 220 is opened). This change of the current sink level is detected by a driver integrated circuit (IC) in the PCM 215 and the length of time interval from the beginning of dwell to the switching point (e.g., a decay time) is interpreted as a level of fouling present at the spark plug. This information is communicated to the microprocessor in the PCM 215. If the microprocessor determines that the level of fouling is too great (e.g., upon comparing the detected level of fouling to a fouling threshold or a decay time to a decay threshold) the microprocessor may warn the driver to replace the spark plugs. For example, the microprocessor may provide a visual, audio, and/or other type of indication to the driver recommending a replacement of the spark plugs.

The D flip-flop 232 may be controlled to store the state of the comparator at the trailing edge of dwell. If pre-ignition occurs, such a condition will cause the comparator output to equal logic 1 at the end of dwell (e.g., as Vsense<Vreference). This logic 1 is captured at the end of dwell and causes switch 220 to remain closed for the entire duration following dwell period. During that dwell period, the microprocessor may interpret the closed switch condition as corresponding to an occurrence of pre-ignition (PI) in the previous combustion event and output an indication to replace the spark plugs.

FIG. 3 is a flow diagram of a method 300 for controlling an ignition coil and detecting spark plug fouling and/or pre-ignition in cooperation with the configuration of FIG. 2, and therefore spark generation, in an engine, such as the engine of FIG. 1. For example, the method 300 may be performed by the controller 12 of FIG. 1 and/or the PCM 215 of FIG. 2 and utilize measurements and/or outputs provided by the integrated circuits of FIG. 2.

At 302, the method 300 includes outputting a dwell command to control an ignition coil, such as the ignition coil 202 of FIG. 2. For example, the dwell command may be a pulse having a defined length (e.g., a pulse that is applied for a duration that is longer than a threshold). During the commanded dwell, current is passed through the primary windings of the ignition coil to generate a magnetic field.

Responsive to detecting the dwell command at a module, such as the dwell signal qualification module 222 of FIG. 2, a blanking period may be generated during which a switch is closed to maintain or set a current sink in an "ON" state, as indicated at 304.

After the blanking period ends, at 306, a voltage at a sensed location in the ignition circuit (e.g., Vsense of FIG. 2) that has a magnitude related to the fouling level of the spark plug is compared to a reference voltage at 308. As indicated at 310, if Vsense is less than the reference voltage (e.g., "NO" at 310), the method 300 proceeds to 312 to close or maintain a closed switch, and then to 314 to determine whether the trailing edge of the dwell command signal is detected. The trailing edge of the dwell command may include a termination of the pulse to trigger an interruption and/or cessation of current flow through the primary windings of the ignition coil. The interruption of the current flow through the primary windings causes a high voltage pulse across the respective secondary windings of the ignition coil (e.g., to "fire" the spark plug and generate a spark for initiating combustion in a cylinder of the engine). If a trailing edge is not detected, (e.g., "NO" at 314), the method 300 returns to 308 to continue monitoring Vsense. Conversely, if the trailing edge of the dwell command signal is detected (e.g., "YES" at 314), a D flip flop (e.g., D flip flop 232 of FIG. 2) is triggered to store the output of the comparison of Vsense to the reference voltage, as indicated at 316. A condition, in which Vsense is less than the reference voltage at the trailing edge of dwell, is indicative of a pre-ignition event. Since the pre-ignition event prevents the switch from being opened to turn off the current sink during the following dwell or combustion cycle, a switching time from beginning of dwell to the switching point may be determined to be approximately equal to the entire dwell time at 318. This switching time may be indicative of a pre-ignition event during the previous combustion cycle. The switching time may also be indicative of the level of fouling of the spark plug. For example, the switching time may be indicative of pre-ignition induced by spark plug fouling.

The method 300 then indicates spark plug fouling based on the ignition current switching time, determined at 318. The method at 320 is expanded at FIG. 5 wherein a number of combustion cycles with a switching time greater than a threshold are tracked (e.g., counted). When a fraction of this number to a total number of combustion cycles in a given vehicle drive cycle is greater than a threshold percentage, spark plug fouling due to fuel additives may be indicated. For example, if the current on the control wire drops below a predetermined value after a threshold period of time has elapsed after the dwell command is provided, the decay time (e.g., switching time) may be determined to be greater than the threshold. Conversely, if the current on the control wire drops below a predetermined value prior to a threshold period of time has elapsed after the dwell command is provided, the decay time may be determined to be less than the threshold. Returning to 310, where the sensed voltage is compared to a reference voltage, if Vsense is greater than the reference voltage (e.g., "YES" at 310), the method 300 proceeds to 324 to determine whether the D flip flop is outputting a logic 0. If not, the output of the D flip flop is a logic 1, which indicates that a pre-ignition event occurred in the previous combustion cycle, as discussed above with respect to 316 and 318. Thus, the method proceeds to 312 to maintain the closed switch and the "ON" state of the current sink. If the D flip flop outputs a logic 0 at 324 (e.g., "YES" at 324), the method 300 proceeds to 326 to open the switch and turn off the current sink. By turning off the current sink, the microprocessor may detect a drop in the measured current on the control wire of the circuit (e.g., by receiving a measurement from a current sensor coupled to the control wire) and measure the switching time from the beginning of dwell to the current sink switching point (e.g., the time at which the current sink is switched from the "ON" state to the "OFF" state). The method may then proceed to 314 to determine if the trailing edge of dwell has occurred.

Exact selection of circuit components for resistors 205 (R1) and 207 (R2) of FIG. 2, the threshold voltage 230 of FIG. 2, and the switching time threshold may be based upon attributes of the ignition coil and the range of spark plug fouling deemed unacceptable. For example, 50M ohms or 10M ohms of shunting (fouling) impedance at the spark plug may be deemed unacceptable in some embodiments. This range may be judged to give adequate warning of plug fouling prior to misfires occurring. Selection of the blanking period duration (e.g., 500 μsec) may depend on the turn-on characteristics and the total nominal dwell time of the ignition coil. Similarly, selection of the switching time threshold, as evaluated in 320, may be determined based upon the duration of the blanking period and the total nominal dwell time of the ignition coil. For example, if the blanking period is 500 μsec and the nominal dwell time is 2000 μsec, resistors 205 and 207 (R1 and R2) and the threshold voltage 230 of FIG. 2 may be chosen to yield a switching time threshold of 1250 μsec at the desired plug fouling level.

FIG. 4 illustrates waveform map 400 reflecting the operation of the ignition system described herein responsive to a dwell command. In the illustrated waveform map, the x-axes correspond to a shared timeline, while each y-axis corresponds to the parameter indicated adjacent to the associated waveform. In FIG. 4, waveform map 400 shows operation of the ignition system responsive to the dwelling and firing the ignition coil (e.g., ignition coil 202 of FIG. 2) under various spark plug fouling conditions.

Waveform 402 corresponds to a dwell command, which may be issued from a controller, such as controller 12 of FIG. 1. As indicated, the dwell signal has a duration extending from time T0 to time T4. Waveform 404 corresponds to a voltage at the high voltage terminal of the secondary windings of an ignition coil (e.g., secondary windings 208 of FIG. 2), which is connected to the spark plug. As indicated, the voltage may decay from a peak level (e.g., approximately 1000 volts) responsive to a level of fouling on the spark plug. Upon termination of the dwell command at time T4, the current provided to the primary windings of the ignition coil may be interrupted, producing a pulse of approximately −30000 volts to be provided to the spark plug for generating a spark.

Waveform 406 corresponds to a sensed voltage (e.g., Vsense as illustrated in FIG. 2) and current on a control wire (e.g., control wire 214 of FIG. 2) measured responsive to the dwell command of waveform 402 during ideal conditions, in which there is no pre-ignition event or spark plug fouling. As illustrated, the sensed voltage remains approximately equivalent to the battery source voltage throughout the measurement period (e.g., without dropping and/or ramping up to the battery voltage responsive to the dwell command). The current on the control wire (Icontrol) reflects the operation of current sinks coupled to the control wire (e.g., current sinks 216 and 218 of FIG. 2). The time between T0 and T1 corresponds to a blanking period, as described at 304 of method 300 illustrated in FIG. 3. During the blanking period, which begins at the rising edge of the dwell command and ends after a predetermined amount of time has elapsed since the start of the dwell command; both current sinks are maintained in an "ON" state, as a switch controlling the second current sink is closed.

After the blanking period ends at time T1, Vsense is measured and compared to a reference voltage (e.g., as described at 310 of FIG. 3). As illustrated in FIG. 2, the reference voltage may be smaller than the battery voltage, and one example value of a reference voltage is indicated on the y-axis of the waveforms of FIG. 4. Since the sensed voltage is greater than the reference voltage at time T1 (e.g., when the blanking period ends), the switch is opened, turning the second current sink off (e.g., in response to the execution of 326 as illustrated in FIG. 3). The switching time may therefore be determined to be equal to the blanking period, if measured from the start of the dwell command to the time at which the second current sink is switched off (e.g., time T1). It is to be understood that the waveform 406 provides the control current during a condition in which pre-ignition was not detected during the previous combustion cycle (e.g., the sensed voltage was greater than the reference voltage at the trailing edge of the dwell command for the previous combustion cycle). Further, the waveform 406 may be an example response of an un-fouled spark plug (as indicated by the switching time being less than the threshold). At time T4, the current drops again responsive to the cessation of the dwell command, which results in a decrease in current provided to the control wire and a decrease in current at the first current sink.

Waveform 408 corresponds to a sensed voltage (e.g., Vsense as illustrated in FIG. 2) and current on a control wire (e.g., control wire 214 of FIG. 2) measured responsive to the dwell command of waveform 402 during a condition in which there is no previous or current pre-ignition event, however a relatively moderate amount of spark plug fouling is present. As illustrated, the sensed voltage drops at the beginning of dwell due to the impedance at the spark plug caused by the fouling. As the fouling during the condition described in waveform 408 is relatively moderate, the sensed voltage may quickly ramp up to the battery voltage, surpassing the reference voltage at time T2. The current on the control wire (Icontrol) reflects the operation of current sinks coupled to the control wire (e.g., current sinks 216 and 218 of FIG. 2). As the sensed voltage does not exceed the reference voltage until time T2, both current sinks remain on and the current is maintained at a peak level until time T2 (at which point, the second current sink is turned off and the current drops). Thus, the switching time 410 under the moderate fouling may correspond to the amount of time that elapses between time T0 and time T2. As described above, at time T4, the current may drop (e.g., no current may flow on the control wire) responsive to the cessation of the dwell command.

Waveform 412 corresponds to a sensed voltage (e.g., Vsense as illustrated in FIG. 2) and current on a control wire (e.g., control wire 214 of FIG. 2) measured responsive to the dwell command of waveform 402 during a condition in which there is no previous or current pre-ignition event, however a relatively high amount of spark plug fouling is present (e.g., the spark plug is more fouled than the condition represented by waveform 408). As illustrated, the sensed voltage drops at the beginning of dwell due to the impedance at the spark plug caused by the fouling. As the fouling during the condition described in waveform 408 is relatively high, the sensed voltage may stay at ground for longer than conditions in which the spark plug is more moderately fouled, and ramp up to surpass the reference voltage at time T3. The current on the control wire (Icontrol) reflects the operation of current sinks coupled to the control wire (e.g., current sinks 216 and 218 of FIG. 2). As the sensed voltage does not exceed the reference voltage until time T3, both current sinks remain on and the current is maintained at a peak level until time T3 (at which point, the second current sink is turned off and the current drops). Thus, the switching time 414 under the high level of fouling may correspond to the amount of time that elapses between time T0 and time T3. The switching time 414 is longer than the switching time 410 since the level of fouling is higher during the condition represented by waveform 412 in comparison with the condition represented by waveform 408. For example, the switching time 414 may be determined to be longer than the switching threshold (e.g., resulting in a "YES" at 320 of FIG. 3) while switching time 410 may be determined to be shorter than the switching threshold (e.g., an acceptable level of fouling, resulting in a "NO" at 320 of FIG. 3). Accordingly, an accumulation of switching times 414 over the switching threshold for a vehicle drive cycle (and a threshold number of engine combustion cycles) may result in an output of an indication to the driver to replace the spark plugs, while the switching time 410 may result in no such indication. As described above, at time T4, the current may drop (e.g., no current may flow on the control wire) responsive to the cessation of the dwell command.

Waveform 416 corresponds to a sensed voltage (e.g., Vsense as illustrated in FIG. 2) and current on a control wire (e.g., control wire 214 of FIG. 2) measured responsive to the dwell command of waveform 402 during a condition in which pre-ignition event occurs. In particular, the sensed voltage corresponds to sensed voltage during a pre-ignition event, and the current on the control wire corresponds to the measured current during the next combustion cycle directly following the pre-ignition event (e.g., pre-ignition has occurred before the trailing edge of dwell in previous combustion cycle). As illustrated, the sensed voltage remains at the battery voltage level until just prior to the trailing edge of the dwell command at T4, at which point the voltage drops to below the reference voltage level. Shown below the sensed voltage are the current on the control wire for the current dwell cycle and the current on the control wire for the next consecutive dwell cycle. The current on the control wire (Icontrol) reflects the operation of current sinks coupled to the control wire (e.g., current sinks 216 and 218 of FIG. 2). During the current dwell cycle, the current drops to the lower level at T1, as expected with no fouling present. Just prior to the end of dwell however, the current jumps to the higher level due to Vsense being less than the reference voltage (resulting in a "NO" at 310 of FIG. 3). At the end of dwell, T4, the D flip-flop captures the pre-ignition event and holds the current on the control wire at the high level through the entire following dwell period as illustrated by Icontrol (next consecutive dwell cycle). Thus, the switching time 418 responsive to the pre-ignition event may correspond to the amount of time that elapses between time T0 and time T4. The switching time 418 is longer than the switching times 410 and 414 due to the pre-ignition event and is reported at the combustion cycle following the pre-ignition event. Accordingly, during the reporting combustion cycle, the switching time may be determined to be above a switching threshold and an indication to change the spark plugs may be output (e.g., via a display or other visual indicator of the vehicle). As described above, at time T4, the current may drop (e.g., no current may flow on the control wire) responsive to the cessation of the dwell command.

FIG. 5 shows a method 500 for differentiating spark plug fouling due to soot accumulation from spark plug fouling due to fuel additive accumulation. Specifically, spark plug fouling may be based on the control current on the control wire of the spark plug following application of a dwell command, as described above. Further, spark plug fouling may be based on the number of combustion events over a vehicle drive cycle for which the switching time is greater than a threshold. The switching time for each engine combustion cycle may be determined and counted, as described at FIG. 3. The controller may then take actions to determine whether the spark plug fouling is due to soot accumulation or fuel additive accumulation. Method 500 may be performed for each cylinder and corresponding spark plug of the engine. As described further below, the switching time of each individual spark plug may be determined and degradation of each spark plug may be determined separately from every other spark plug of the engine.

The method begins at 502 by estimating and/or measuring engine operating conditions. Engine operating conditions may include engine speed and load, spark timing, VCT, VVT, mass air flow, etc. At 504, the controller may apply a dwell command to the control wire of the ignition coil, as described above with reference to FIG. 3. For example, for each engine combustion cycle, a dwell command is generated in order to create spark via the spark plug. Thus, the method at 504 may include determining a time from a start of dwell for a specific cylinder to the switch opening. At 506, the method includes monitoring the ignition current switching time for a number of engine combustion cycles. For example, the method at 506 may include counting (e.g., on a counter of the controller) the number of combustion cycles for which the switching time is higher than a threshold duration (e.g., switching threshold described at FIG. 3). As introduced above, long switching times (over a threshold) for a number of combustion cycles in a population of combustion cycles may be indicative of the type of spark plug fouling. On the other hand, the length of the switching time for an individual combustion event may be indicative of the degree of spark plug fouling but not the type of fouling.

At 508, the method includes estimating a fraction of engine (combustion) cycles over a given vehicle drive cycle with a switching time greater than the threshold duration. In one example, the given drive cycle may include a threshold number of continuous combustion events. In another example, the given drive cycle may include a threshold number of combustion events interrupted by an engine on/off event. The threshold number of combustion events within the given drive cycle may further be based on a duration of engine operation and/or a distance of vehicle travel. In this way, the switching time may be monitored for each combustion event (for each individual cylinder corresponding to one or more spark plugs) for a threshold distance, time, and/or number of combustion events. In one example, the estimating at 508 may include counting, on a first counter, the fraction of combustion cycles of a given vehicle drive cycle that have switching times longer than the threshold duration. The fraction of combustion cycles may be determined by dividing the number of combustion cycles having the switching time greater than the threshold by the total number of combustion cycles included in the given vehicle drive cycle. In another example, the estimating at 508 may include counting, on a second counter, an average switching time for the given cylinder over a number of combustion cycles of the given vehicle drive cycle.

At 509, the method includes storing the fraction of fouled cycles for multiple drive cycles. For example, each fraction of engine cycles over the given vehicle drive cycle with switching times higher than the threshold duration (e.g., fraction of fouled cycles) may be stored within a memory of the controller. The controller may then use this information to determine if the fraction of combustion cycles indicating spark plug fouling (e.g., fouled cycles) is changing from one vehicle drive cycle to the subsequent vehicle drive cycle. In this way, the controller may compare the fractions for one or more drive cycles. For example, the controller may determine fractions for five different drive cycles. The controller may then compare the five different fractions to determine if the fractions are increasing, decreasing, remaining relatively constant, or fluctuating (e.g., both increasing and decreasing over the plurality of drive cycles). The controller may further determine a rate of change in the fraction over the one or more drive cycles.

At 510, the method includes determining if the fraction of fouled combustion cycles is fluctuating over one or more vehicle drive cycles. Said another way, the method at 510 may include determining if a change in the fraction over one or more drive cycles is fluctuating between the one or more drive cycles. For example, the method at 510 may include determining if the fraction of fouled combustion cycles is increasing from a first drive cycle to a second drive cycle and then decreasing from the second drive cycle to a third drive cycle. This may further includes some vehicle drive cycles out of the one or more vehicle drive cycles having fractions of approximately zero, thereby indicating no spark plug fouling. For example, if a first fraction of fouled combustion cycles is 10% for the first drive cycle, the second fraction is 12% for the second drive cycle, and then the third fraction is 8% for the third drive cycle, the fractions between drive cycles may be considered fluctuating. If the fraction of fouled combustion cycles is fluctuating over the one or more vehicle drive cycles, the method continues on to 522 to indicate spark plug fouling from soot accumulation.

In another embodiment, the method at 510 may additionally or alternatively include determining if the fraction determined at 508 is greater than a threshold percentage. In one example, the threshold percentage is based on an average percentage (e.g., fraction) of engine cycles over a given vehicle drive cycle with switching time higher than the threshold duration in an engine not exposed to fuel additives. In engines not exposed to fuel additives (due to combusting fuel not containing additives), spark plugs may become fouled due to soot. However, soot fouling may be intermittent (come and go over a series of combustion cycles) during engine operation. Conversely, fuel additive fouling may be relatively permanent and not go away during engine operation, even if spark plug temperatures are increased in attempts to reduce soot formed on the plug. Thus, the average fraction (e.g., percentage) in an engine not exposed to fuel additives may be lower than an engine combusting fuel with fuel additives. In some examples, the threshold percentage may be based on a percentage indicative of more permanent spark plug fouling.

In another embodiment, the method at 510 may include determining if an average switching time for the given cylinder over the number of combustion cycles of the given vehicle drive cycle is greater than a threshold switching time. As discussed above, the threshold switching time may be based on an average switching time in an engine not exposed to fuel containing fuel additives.

If the fraction (or the average switching time) is not greater than the threshold at 510, the method continues on to 522 to indicate spark plug fouling from soot and not from fuel additives. In some embodiments, this may be done in conjunction with determining the change in the fraction over the one or more drive cycles. In this way, the method may only proceed on to 522 to indicate soot fouling if each of the fractions in the one or more drive cycles is below the threshold and the change in the fractions over the one or more drive cycles are fluctuating.

Thus, at 522, the method includes indicating spark plug fouling due to soot. As a result, the operator is not alerted and engine operation may continue without requiring immediate changing or servicing of the spark plug. In one example, in response to determination that the spark plug had been fouled with soot, the controller may set a first diagnostic code and note the conditions under which soot accumulation occurred. It may be possible that the soot may be burned off the spark plug during regular engine operation (e.g., regular combustion events) after a number of combustion events. However, the method may optionally continue on to 524 to adjust engine operating parameters to actively (e.g., intrusively) burn off soot from the spark plug. Soot accumulation on the spark plug may be at least partially removed by increasing a temperature of the spark plug to effectively burn the soot off the spark plug. In one example, the method at 524 may include one or more of increasing idling engine speed and/or load or advancing spark timing. The engine speed or load may be increased via adjustments to a transmission, such as via transmission upshifts or downshifts. In another example, the method at 524 may be continued for a threshold number of combustion cycles. The threshold number of combustion cycles may be based on a number of combustion cycles that may result in removal of soot from the spark plug.

The method may then circle back to 504 to reassess the time from the start of dwell to the switch point of the current on the control wire (e.g., the switching time). Thus, the method may continue back to 506 and 508 to monitor the switching time for each spark plug and each combustion event and count the cycles for which the switching time is greater than the threshold duration. The method may then reassess if the fraction is greater than the threshold percentage at 510 and/or if the change in the fraction over a series of drive cycles is fluctuating to see if the fouling has been resolved. In some embodiments, the method may further include indicating no spark plug fouling from soot or from fuel additives if all the fraction is approximately zero (e.g., all the switching times over the drive cycle are below the threshold duration).

Returning to 510, if the fraction of fouled combustion cycles over the one or more drive cycles is not fluctuating, the method continues on to 511. At 511, the method includes determining if the fraction of fouled combustion cycles over the one or more vehicle drive cycles is relatively constant or increasing. Said another way, the method at 511 may include determining if a change in the fraction over one or more drive cycles is remaining relatively constant or increasing between the one or more drive cycles. For example, the method at 511 may include determining if the fraction of fouled combustion cycles is increasing from a first drive cycle to a second drive cycle to a third drive cycle. For example, if a first fraction of fouled combustion cycles is 40% for the first drive cycle, the second fraction is 50% for the second drive cycle, and then the third fraction is 60% for the third drive cycle, the fractions between drive cycles may be considered increasing. If the fraction of fouled cycles is not increasing and not relatively constant, the fractions may be substantially zero (or very low percentages). Thus, the method continues on to 530 to indicate no spark plug fouling.

However, if the fraction of fouled combustion cycles is increasing or remaining relatively constant over the one or more vehicle drive cycles, the method continues on to 512 to indicate spark plug fouling from fuel additive accumulation. In another embodiment, if the fraction of fouled combustion cycles is increasing or remaining relatively constant over the one or more vehicle drive cycles and each of the fractions is greater than the threshold, the method continues on to 512 to indicate spark plug fouling from fuel additive accumulation. Since the fraction of fouled combustion cycles is increasing and/or staying relatively constant over one or more vehicle drive cycles, spark plug fouling may be more permanent, thereby indicating the spark plug fouling is due to fuel additives and not due to soot alone.

At 514, the method includes adjusting fueling of the affected cylinder and/or one or more additional cylinders. In one example, the method at 514 may include limiting an engine load. In another example, the method at 514 may include temporarily enriching a second cylinder configured to receive exhaust residuals from a first cylinder, wherein the fouled spark plug is coupled to the first cylinder. In this way, a risk of pre-ignition in the second cylinder may be reduced. In yet another example, the method at 514 may include cutting off fuel injection (and/or spark) to the combustion chamber coupled to the fouled spark plug (e.g., the first cylinder).

The method at 516 may then include alerting the vehicle operator and/or indicating that the spark plugs need to be replaced (e.g., by setting a diagnostic code to recommend spark plug change or replacement). For example, the controller may set a second diagnostic code (different from the first diagnostic code) and note the conditions under which fuel additive accumulation occurred. In another example, indicating spark plug fouling may include sending an instruction to an icon or display device on an instrument panel to display a visual indicator to the driver regarding the spark plug replacement recommendation. Indicating may additionally or alternatively include sending an instruction to a speaker system to output an audio indicator (e.g., an audio message, a system beep, etc.) regarding the spark plug change recommendation. Further, indicating spark plug fouling due to fuel additives may include setting a diagnostic code.

At 518, the method includes determining if the fouled spark plug has be replaced. For example, upon replacement of the spark plug, the controller may receive a signal indicating a new spark plug has been installed in the engine. Upon replacement of the fouled spark plug, the corresponding monitor (e.g., counter) for that spark plug is reset at 520. As described above, the counter may be a counter configured to count the fraction of combustion cycles, over the given vehicle drive cycle, having an ignition current switching time that is higher than the threshold duration.

In addition to fouling spark plugs, accumulation of fuel additives may also cause degradation of exhaust oxygen sensors and/or exhaust catalysts within the engine exhaust. As introduced above, exhaust oxygen sensors may operate at a switching frequency (or response time). Over time and as a sensor degrades, the switching frequency (or response time) may decrease relative to a switching frequency of a new and/or non-degraded sensor. Further, as the exhaust catalyst degrades, the switching frequencies of a pre-catalyst exhaust oxygen sensor (e.g., an upstream UEGO sensor) and a post-catalyst exhaust oxygen sensor (e.g., a downstream HEGO sensor) may match more closely. For example, a difference between the switching frequencies of the two sensors may decrease and be less than a threshold difference. The exhaust oxygen sensors and/or exhaust catalysts may degrade at different rates based on whether the engine is operating with a standard fuel without additives or a fuel including fuel additives (such as MMT). For example, the switching frequency of the exhaust gas sensor may decay at a different rate when the degradation is due to standard fuel vs. fuels including fuel additives (with higher octane levels). Similarly, the exhaust catalyst may degrade differently due to fuel additive contamination relative to regular exhaust catalyst degradation.

FIG. 6 shows a method 600 for determining exhaust oxygen sensor degradation based on spark plug fouling from fuel additives indicated based on an ignition coil switching time, as determined at FIG. 5. In one example, the exhaust oxygen sensor may be an exhaust oxygen sensor positioned upstream of an exhaust catalyst (such as the exhaust oxygen sensor 126 shown in FIG. 1). In another example, the exhaust oxygen sensor may be an exhaust oxygen sensor positioned downstream of the exhaust catalyst (such as the exhaust oxygen sensor 186 shown in FIG. 1). Further, the exhaust oxygen sensor may be a UEGO, HEGO, or EGO sensor. Method 600 may be executed by a controller, such as controller 12 shown in FIG. 1.

The method begins at 602 by determining the switching frequency of the exhaust oxygen sensor (e.g., UEGO or HEGO). The switching frequency (or response time) may be determined by the controller during a period of operation of the exhaust oxygen sensor. For example, a number of times the exhaust oxygen sensor feedback voltage crosses a threshold voltage in the increasing or decreasing direction over a period of time may be indicative of the switching frequency. In another example, the response time of the exhaust oxygen sensor may be related to the response to scheduled fuel delivery (e.g., a number of times a change in scheduled fuel delivery occurs).

At 604, the method includes determining if spark plug fouling from fuel additives is indicated based on ignition coil switching time (as determined at FIG. 5). If the spark plug fouling is not due to fuel additives (or the spark plugs are not fouled), the method ends. Alternatively, if spark plug fouling due to fuel additives is indicated during the method at FIG. 5, method 600 continues on to 606. At 606, the method includes determining if the exhaust oxygen sensor switching frequency or response time is less than a threshold. The threshold may be based on a switching frequency or response time of an exhaust gas sensor in an engine not exposed to fuel additives (e.g., an engine combusting fuel that does not contain fuel additives). If the exhaust oxygen sensor switching frequency (or response time) is less than the threshold, the controller may indicate exhaust oxygen sensor degradation at 608. This may include indicating exhaust oxygen sensor degradation due to fuel additives. In some examples, the method at 608 may include setting a diagnostic code and/or alerting the vehicle operator. Alternatively, if the exhaust oxygen sensor switching frequency is not less than the threshold, no exhaust oxygen sensor degradation due to fuel additives is indicated and engine operation continues at 612.

The method may also include confirming spark plug fouling due to fuel additives, based on indication of exhaust oxygen sensor degradation at 610.

In this way, if spark plug fouling due to fuel additive accumulation is indicated and an exhaust oxygen sensor switching frequency or response time decays below a threshold, the controller may indicate exhaust oxygen sensor degradation due to fuel additives. The controller may then set a diagnostic code and/or alert the vehicle operator to replace both the degraded spark plug(s) and the degraded exhaust oxygen sensor.

Turning now to FIG. 7, a method 700 is shown for determining exhaust catalyst degradation based on a switching frequency ratio or response time degradation between a first exhaust oxygen sensor upstream of the exhaust catalyst and a second exhaust oxygen sensor downstream of the exhaust catalyst. As the difference between a first switching frequency of the first exhaust oxygen sensor and a second switching frequency of the second exhaust oxygen sensor decreases, exhaust catalyst degradation may increase. When the difference in the pre and post-catalyst sensor switching frequencies or response times decreases below a threshold, the controller may indicate degradation of the exhaust catalyst. In one example, the first exhaust oxygen sensor may be a pre-catalyst oxygen sensor positioned upstream of the exhaust catalyst (such as the exhaust oxygen sensor 126 shown in FIG. 1) and the second exhaust oxygen sensor may be a post-catalyst oxygen sensor positioned downstream of the exhaust catalyst (such as the exhaust oxygen sensor 186 shown in FIG. 1. Further, the first sensor may be a UEGO sensor and the second sensor may be a HEGO sensor. For example, if the upstream sensor is a UEGO sensor, response time instead of switching frequency may be monitored to see if degradation has taken place since a UEGO is a linear output sensor that does not switch about a voltage level. Method 700 may be executed by a controller, such as controller 12 shown in FIG. 1.

The method begins at 702 by determining the switching frequency or response time of the pre-catalyst oxygen sensor and the post-catalyst oxygen sensor. The switching frequency may be determined for both sensors, as described above at 602. At 704, the method includes determining if spark plug fouling from fuel additives has been indicated. For example, spark plug fouling due to fuel additive accumulation may be determined at FIG. 5. If no spark plug fouling from fuel additives is indicated, the method ends.

Alternatively, if spark plug fouling from fuel additives is indicated, as described at 512 in FIG. 5, the method continues on to 706 to determine if the pre-catalyst oxygen sensor switching frequency or response time is within the threshold of the post-catalyst oxygen sensor switching frequency. Said another way, the controller determines if the difference between the switching frequencies of the pre-catalyst oxygen sensor and the post-catalyst oxygen sensor is less than the threshold. If the difference in switching frequencies (or response times) is below the second threshold, the controller indicates catalyst degradation due to fuel additives at 708. The method at 708 may further include setting a diagnostic code and/or alerting the vehicle operator that the catalyst is degraded. However, if the difference in switching frequencies is not less than the threshold at 706, the method continues on to 712 to not indicate catalyst degradation. The controller may continue monitoring the difference in the pre- and post-catalyst oxygen sensor switching frequencies as engine operation continues.

At 710, the method may further include confirming spark plug fouling due to fuel additives based on the indication that the exhaust catalyst is degraded due to fuel additives.

In this way, if spark plug fouling due to fuel additive accumulation is indicated and a difference in switching frequencies between an exhaust oxygen sensor upstream of an exhaust catalyst and an exhaust oxygen sensor downstream of the exhaust catalyst is less than a threshold, the controller may indicate exhaust catalyst degradation due to fuel additives. The controller may then set a diagnostic code and/or alert the vehicle operator to service and/or replace both the degraded spark plug(s) and the degraded exhaust catalyst.

In this way, an origin of spark plug fouling may be accurately and reliably determined. Accordingly, spark plug change recommendations may be provided based on whether spark plug fouling is indicated and whether the fouling is due to soot accumulation or fuel additive accumulation on a tip of the spark plug. By improving the differentiation of different types of spark plug fouling, mitigating adjustments can be appropriately selected, and spark plug fouling induced pre-ignition can be pre-empted. In addition, spark plug replacements can be requested only upon confirmation of sufficiently irreparable spark plug degradation. This reduces the frequency with which spark plug changes are requested, lowering vehicle operation costs. Further, degradation of one or more an exhaust oxygen sensor and/or an exhaust catalyst due to fuel additive accumulation may be determined based on switching frequencies of the exhaust oxygen sensors relative to a threshold and the type of spark plug fouling. Overall, by reliably diagnosing spark plug health and exhaust component health, engine life is improved.

As one embodiment, a method for an engine comprises: for each engine cylinder, differentiating spark plug fouling due to soot accumulation from spark plug fouling due to fuel additive accumulation based on a fraction of combustion cycles, over one or more given vehicle drive cycles, having an ignition current switching time that is higher than a threshold duration. In one example, wherein the ignition current switching time is an ignition current switching time of a current on a control wire of a spark plug, the current measured via a current sensor, and where differentiating based on the ignition current switching time includes differentiating based on a switching time taken for the current to drop below a predetermined value after application of a dwell command. In another example, the threshold duration is based on the dwell command applied.

In one example, the differentiating includes, indicating spark plug fouling due to soot accumulation in response to a change in the fraction over the one or more given vehicle drive cycles fluctuating between the one or more given vehicle drive cycles and indicating spark plug fouling due to fuel additive accumulation in response to the change in the fraction remaining constant or increasing between the one or more given vehicle drive cycles. In another example, the differentiating includes, indicating spark plug fouling due to soot accumulation in response to the fraction being smaller than a threshold percentage and indicating spark plug fouling due to fuel additive accumulation in response to the fraction being larger than the threshold percentage. The differentiating may be further based on an average cylinder ignition event switching time for combustion cycles over the given vehicle drive cycle. In yet another example, the differentiating includes indicating spark plug fouling due to fuel additive accumulation in response to the average cylinder ignition event switching time being longer than a threshold time, and indicating spark plug fouling due to soot accumulation in response to the average cylinder ignition event switching time being shorter than the threshold time. The method may further comprise indicating a degree of spark plug fouling based on the switching time. In yet another example, the method may further comprise, in response to the indication of spark plug fouling due to soot accumulation, but not due to fuel additive accumulation, temporarily raising a spark plug tip temperature above a threshold temperature for a threshold number of engine cycles by one or more of advancing spark timing from MBT and increasing an engine speed or load. In one example, indicating spark plug fouling due to fuel additive accumulation includes indicating no spark plug fouling due to soot accumulation.

The method may further comprise in response to the indication of spark plug fouling due to fuel additive accumulation, limiting an engine load. In one example, the fouled spark plug is coupled to a first cylinder, and the method further comprises, in response to the indication of spark plug fouling due to fuel additive accumulation, temporarily enriching a second cylinder configured to receive exhaust residuals from the first cylinder. The method may further comprise in response to the indication of spark plug fouling due to fuel additive accumulation, setting a diagnostic code to recommend spark plug replacement.

The method may further comprise monitoring a switching frequency of each of a first exhaust oxygen sensor coupled upstream of an exhaust catalyst and a second exhaust oxygen sensor coupled downstream of the exhaust catalyst over a number of engine cycles; and in response to a ratio of the switching frequency of the first and second exhaust oxygen sensor being within a threshold of each other over the number of engine cycles while spark plug fouling due to fuel additive accumulation is indicated, indicating exhaust catalyst degradation due to fuel additive accumulation. In one example, the first exhaust oxygen sensor is a UEGO sensor and wherein the second exhaust oxygen sensor is a HEGO sensor.

The method may further comprise in response to operator input indicative of spark plug replacement, resetting a counter configured to count the fraction of combustion cycles, over the given vehicle drive cycle, having an ignition current switching time that is higher than the threshold duration. In another example, the fuel additive includes one or more of ferrocene, lead, and MMT.

As another embodiment, a method for an engine comprises indicating spark plug fouling due to soot accumulation in response to a fraction of combustion cycles over a vehicle drive cycle having an ignition current switching time that is longer than a threshold duration being less than a threshold percentage; and indicating spark plug fouling due to fuel additive accumulation in response to the fraction being more than the threshold percentage. In one example, the threshold percentage is based on an average percentage in an engine not exposed to fuel additives. In another example, the threshold duration is based on a dwell command applied to an ignition system of the engine during a cylinder ignition event, and further based on an operational status of a current sink of the ignition system. Indicating spark plug fouling due to soot accumulation may include indicating no spark plug fouling due to fuel additive accumulation and indicating spark plug fouling due to fuel additive accumulation may include indicating no spark plug fouling due to soot accumulation. The method may further comprise indicating spark plug fouling due to soot accumulation based on a decrease in the fraction following engine operation at or above a threshold engine speed or load that raises a spark plug tip temperature above a threshold temperature. In another example, the method further comprises in response to the indication of spark plug fouling due to fuel additive accumulation, limiting an engine load, and based on an identity of the cylinder coupled to the fouled spark plug, enriching an adjacent cylinder configured to receive exhaust residuals from the cylinder coupled to the fouled spark plug. In yet another example, the method further comprises in response to the indication of spark plug fouling due to soot accumulation, setting a first diagnostic code to recommend spark plug cleaning, and in response to the indication of spark plug fouling due to fuel additive accumulation, setting a second, different diagnostic code to recommend spark plug replacement. The method may further comprise after indicating spark plug fouling due to fuel additive accumulation, monitoring a response time of each of a first exhaust oxygen sensor coupled upstream of an exhaust catalyst and a second exhaust oxygen sensor coupled downstream of the exhaust catalyst over a number of engine cycles; and in response to a ratio of the response times of the first and second exhaust oxygen sensor being within a threshold of one another over the number of engine cycles, indicating exhaust catalyst degradation due to fuel additive accumulation. As one example, the first exhaust oxygen sensor is a UEGO sensor and wherein the second exhaust oxygen sensor is a HEGO sensor.

As yet another embodiment, an engine system comprises: an engine including a cylinder; an ignition system including an ignition coil and a control wire coupled to a spark plug of the cylinder, the ignition system further including a current sensor for sensing a current of the control wire; a direct fuel injector for delivering fuel to the cylinder; and a throttle coupled to an engine intake manifold for adjusting an airflow to the cylinder. The system further comprises a controller with computer readable instructions on non-transitory memory for: outputting a dwell command on the control wire to start dwell of the ignition coil; determining a switching time from a beginning of the dwell command to a switching point where a current of the control wire falls below a predetermined value; counting, on a first counter, a fraction of combustion cycles of a given vehicle drive cycle that have the ignition current switching time longer than a threshold duration; counting, on a second counter, an average ignition current switching time for the cylinder over a number of combustion cycles of the given vehicle drive cycle; and in response to one or more of the average switching time being longer than a threshold duration and the fraction being larger than a threshold percentage, indicating spark plug fouling due to fuel additive accumulation. The controller includes further instructions for: in response to the fraction fluctuating while remaining smaller than the threshold percentage, increasing an engine load to raise spark plug temperature above a threshold temperature; and if the fraction remains below the threshold percentage after the increasing, indicating spark plug fouling due to soot accumulation; and if the fraction increases above the threshold percentage after the increasing, indicating spark plug fouling due to fuel additive accumulation. The system further comprises an exhaust manifold of the engine, the exhaust manifold including an exhaust catalyst, a first UEGO sensor upstream of the exhaust catalyst, and a second HEGO sensor downstream of the exhaust catalyst, where the controller includes further instructions for: monitoring a switching frequency of each of the first and second sensors; in response to a difference between the switching frequency of the first sensor and the switching frequency the second sensor being lower than a threshold difference when spark plug fouling due to fuel additive accumulation is indicated, indicating exhaust catalyst degradation due to fuel additive accumulation; and in response to the switching frequency of the first sensor being lower than a threshold frequency when spark plug fouling due to fuel additive accumulation is indicated, indicating degradation of the first sensor due to fuel additive accumulation.

In another representation, a method for an engine comprises: for each combustion event of a cylinder, outputting a dwell command on a control wire of a spark plug ignition coil; estimating an ignition current switching time taken for a current of the control wire to drop below a pre-determined value; counting a fraction of combustion cycles of the cylinder over a given vehicle drive cycle that have the ignition current switching time longer than a threshold duration; and indicating fouling of the cylinder's spark plug due to fuel additive accumulation on the spark plug based on the fraction being larger than a threshold percentage. The method may further comprise estimating an average ignition current switching time for the cylinder over a number of combustion cycles of the given vehicle drive cycle, and in response to the estimated average ignition current switching time being longer than a threshold time, indicating spark plug fouling due to fuel additive accumulation on the spark plug of the cylinder. In one example, the duration is a threshold duration based on the dwell command applied and an operational status of a current sink, and the threshold percentage is based on an average percentage in an engine operating with a fuel not including fuel additives. The method may further comprise in response to the fraction being smaller than the threshold percentage, increasing an engine idling speed and engine load, and advancing spark ignition timing of the cylinder to maintain a tip temperature of the spark plug above a threshold temperature for a threshold duration; after the threshold duration, reassessing the fraction of combustion cycles of the cylinder; and in response to the reassessed fraction being smaller than the threshold percentage, indicating spark plug fouling due to soot accumulation. The method may further comprise in response to the indication of spark plug fouling due to fuel additive accumulation, decreasing an engine load, and disabling fuel and spark for an adjacent cylinder configured to receive exhaust residuals from the cylinder coupled to the fouled spark plug. In another example, the method may further comprise estimating a response time of an exhaust oxygen sensor coupled upstream of an exhaust catalyst; and based on the estimated response time being lower than a threshold, indicating degradation of the exhaust oxygen sensor due to fuel additive accumulation and confirming spark plug fouling due to fuel additive accumulation.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
for each engine cylinder, differentiating spark plug fouling due to soot accumulation from spark plug fouling due to fuel additive accumulation based on a fraction of combustion cycles, over one or more given vehicle drive cycles, having an ignition current switching time that is higher than a threshold duration.

2. The method of claim 1, wherein the ignition current switching time is an ignition current switching time of a spark plug including a spark plug ignition coil, the spark plug ignition coil including a control wire, wherein a current on the control wire is measured via a current sensor, and wherein differentiating based on the ignition current switching time includes differentiating based on a switching time taken for the current to drop below a predetermined value after application of a dwell command on the control wire.

3. The method of claim 1, wherein the differentiating includes,
indicating spark plug fouling due to soot accumulation in response to a change in the fraction over the one or more given vehicle drive cycles fluctuating between the one or more given vehicle drive cycles and indicating spark plug fouling due to fuel additive accumulation in response to the change in the fraction remaining constant or increasing between the one or more given vehicle drive cycles.

4. The method of claim 1, wherein the differentiating includes,
indicating spark plug fouling due to soot accumulation in response to the fraction being smaller than a threshold percentage and indicating spark plug fouling due to fuel additive accumulation in response to the fraction being larger than the threshold percentage.

5. The method of claim 4, wherein the differentiating is further based on an average cylinder ignition event switching time for combustion cycles over the given vehicle drive cycle, and wherein the differentiating includes indicating spark plug fouling due to fuel additive accumulation in response to the average cylinder ignition event switching time being longer than a threshold time, and indicating spark plug fouling due to soot accumulation in response to the average cylinder ignition event switching time being shorter than the threshold time.

6. The method of claim 5, further comprising indicating a degree of spark plug fouling based on the switching time.

7. The method of claim 4, further comprising, in response to the indication of spark plug fouling due to soot accumulation, but not due to fuel additive accumulation, temporarily raising a spark plug tip temperature above a threshold temperature for a threshold number of engine cycles by one or more of advancing spark timing from MBT and increasing an engine speed or load.

8. The method of claim 4, wherein indicating spark plug fouling due to fuel additive accumulation includes indicating no spark plug fouling due to soot accumulation and further comprising, in response to the indication of spark plug fouling due to fuel additive accumulation, one or more of limiting an engine load, setting a diagnostic code to recommend spark plug replacement, and temporarily enriching a second cylinder, wherein the fouled spark plug is coupled to a first cylinder, the second cylinder configured to receive exhaust residuals from the first cylinder.

9. The method of claim 4, further comprising,
monitoring a switching frequency of each of a first exhaust oxygen sensor coupled upstream of an exhaust catalyst and a second exhaust oxygen sensor coupled downstream of the exhaust catalyst over a number of engine cycles; and
in response to a ratio of the switching frequency of the first and second exhaust oxygen sensor being within a threshold of each other over the number of engine cycles while spark plug fouling due to fuel additive accumulation is indicated, indicating exhaust catalyst degradation due to fuel additive accumulation.

10. The method of claim 1, further comprising, in response to operator input indicative of spark plug replacement, resetting a counter configured to count the fraction of combustion cycles, over the given vehicle drive cycle, having an ignition current switching time that is higher than the threshold duration.

11. A method for an engine, comprising:
indicating spark plug fouling due to soot accumulation in response to a fraction of combustion cycles over a vehicle drive cycle having an ignition current switching time that is longer than a threshold duration being less than a threshold percentage; and
indicating spark plug fouling due to fuel additive accumulation in response to the fraction being more than the threshold percentage.

12. The method of claim 11, wherein the threshold percentage is based on an average percentage in an engine not exposed to fuel additives, wherein the threshold duration is based on a dwell command applied to an ignition system of the engine during a cylinder ignition event, and further based on an operational status of a current sink of the ignition system, wherein indicating spark plug fouling due to soot accumulation includes indicating no spark plug fouling due to fuel additive accumulation, and wherein indicating spark plug fouling due to fuel additive accumulation includes indicating no spark plug fouling due to soot accumulation.

13. The method of claim 11, further comprising, indicating spark plug fouling due to soot accumulation based on a decrease in the fraction following engine operation at or above a threshold engine speed or load that raises a spark plug tip temperature above a threshold temperature.

14. The method of claim 11, further comprising, in response to the indication of spark plug fouling due to fuel additive accumulation, limiting an engine load, and based on an identity of the cylinder coupled to the fouled spark plug, enriching an adjacent cylinder configured to receive exhaust residuals from the cylinder coupled to the fouled spark plug.

15. The method of claim 11, further comprising, in response to the indication of spark plug fouling due to soot accumulation, setting a first diagnostic code to recommend spark plug cleaning, and in response to the indication of spark plug fouling due to fuel additive accumulation, setting a second, different diagnostic code to recommend spark plug replacement.

16. The method of claim 11, further comprising,
after indicating spark plug fouling due to fuel additive accumulation,
monitoring a response time of each of a first exhaust oxygen sensor coupled upstream of an exhaust catalyst and a second exhaust oxygen sensor coupled downstream of the exhaust catalyst over a number of engine cycles; and
in response to a ratio of the response times of the first and second exhaust oxygen sensor being within a threshold of one another over the number of engine cycles, indicating exhaust catalyst degradation due to fuel additive accumulation.

17. The method of claim 16, wherein the first exhaust oxygen sensor is a UEGO sensor and wherein the second exhaust oxygen sensor is a HEGO sensor.

18. An engine system, comprising:
an engine including a cylinder;
an ignition system including an ignition coil and a control wire coupled to a spark plug of the cylinder, the ignition system further including a current sensor for sensing a current of the control wire;
a direct fuel injector for delivering fuel to the cylinder;
a throttle coupled to an engine intake manifold for adjusting an airflow to the cylinder; and
a controller with computer readable instructions on non-transitory memory for:
outputting a dwell command on the control wire to start dwell of the ignition coil;
determining a switching time from a beginning of the dwell command to a switching point where a current of the control wire falls below a predetermined value;
counting, on a first counter, a fraction of combustion cycles of a given vehicle drive cycle that have the ignition current switching time longer than a threshold duration;
counting, on a second counter, an average ignition current switching time for the cylinder over a number of combustion cycles of the given vehicle drive cycle; and
in response to one or more of the average switching time being longer than a threshold duration and the fraction being larger than a threshold percentage, indicating spark plug fouling due to fuel additive accumulation.

19. The system of claim 18, wherein the controller includes further instructions for:
in response to the fraction fluctuating while remaining smaller than the threshold percentage,
increasing an engine load to raise spark plug temperature above a threshold temperature; and
if the fraction remains below the threshold percentage after the increasing, indicating spark plug fouling due to soot accumulation; and
if the fraction increases above the threshold percentage after the increasing, indicating spark plug fouling due to fuel additive accumulation.

20. The system of claim 18, further comprising an exhaust manifold of the engine, the exhaust manifold including an exhaust catalyst, a first UEGO sensor upstream of the exhaust catalyst, and a second HEGO sensor downstream of the exhaust catalyst, wherein the controller includes further instructions for:
monitoring a switching frequency of each of the first and second sensors;
in response to a difference between the switching frequency of the first sensor and the switching frequency the second sensor being lower than a threshold difference when spark plug fouling due to fuel additive accumulation is indicated, indicating exhaust catalyst degradation due to fuel additive accumulation; and
in response to the switching frequency of the first sensor being lower than a threshold frequency when spark plug fouling due to fuel additive accumulation is indicated, indicating degradation of the first sensor due to fuel additive accumulation.

* * * * *